United States Patent [19]

Chen et al.

[11] Patent Number: 4,837,654

[45] Date of Patent: Jun. 6, 1989

[54] CONTROL APPARATUS FOR THREE PHASE ALTERNATING CURRENT LOAD PROTECTION

[76] Inventors: Wenbing Chen; Da Q. Chen, both of 6203 10th Ave., #2R, Brooklyn, N.Y. 11219

[21] Appl. No.: 143,842

[22] Filed: Jan. 14, 1988

Related U.S. Application Data

[63] Continuation-in-part of Ser. No. 46,455, May 5, 1987, abandoned.

[51] Int. Cl.[4] ............................................. H02H 3/05
[52] U.S. Cl. .......................................... 361/93; 361/47; 361/63; 361/88
[58] Field of Search ................................. 361/47-63, 361/88, 93-98

[56] References Cited

U.S. PATENT DOCUMENTS

| | | | |
|---|---|---|---|
| 4,297,738 | 10/1981 | Lee | 361/47 |
| 4,704,653 | 11/1987 | Li | 361/63 |
| 4,758,919 | 7/1988 | Stewart | 361/63 |
| 4,761,704 | 8/1988 | Fraisse et al. | 361/47 |

Primary Examiner—A. D. Pellinen
Assistant Examiner—Jeffrey A. Gaffin
Attorney, Agent, or Firm—Anthony F. Cuoco

[57] ABSTRACT

Control apparatus for three phase alternating current load protection wherein each of the phases of the load is connected to a corresponding current transformer. When the load is energized by a three phase power supply the transformers induce signals which are applied to a signal detection circuit. The detection circuit controls a relay means. If any of the three power phases is lost the detection circuit is interrupted causing the relay means to drop out, whereby the load, the power supply and auxilliary circuitry, as the case may be, are protected.

14 Claims, 2 Drawing Sheets

CONTROL APPARATUS FOR THREE PHASE ALTERNATING CURRENT LOAD PROTECTION

CROSS REFERENCES TO OTHER APPLICATIONS

This application is a continuation-in-part of U.S. application Ser. No. 046,455 filed by the present inventors on May 5, 1987 and now abandoned.

BACKGROUND OF THE INVENTION

This invention relates to control apparatus for a three phase alternating current (AC) load which, in combination with manually or magnetically operable means prevents overloading and load burnout; protects the load power supply; and otherwise functions as a monitoring arrangement for the circuitry involved.

Prior to the present invention load protection means for the purposes described included, in combination, bimetallic relays/switches and/or circuit breakers/fuses. In this connection it is noted that for a load such as a three phase motor the motor starting current is five to ten times that of the motor running current. Accordingly, the load protection means used required a capacity to accomodate the higher starting current over a predetermined range, depending on the motor starting time.

With a three phase motor, when one phase malfunctions the motor starting or running current will increase by at least the $\sqrt{3}$ times the normal starting or running current, as is well known by those skilled in the art. This condition leads to motor overload. While prior art protection means interrupts the power to the motor, a time delay for this interruption is experienced due to the heretofore mentioned motor starting current range. This can result in motor burnout, or in a malfunction of the motor power supply.

In regard to a motor power supply malfunction, consider a 100 ampere power supply driving a three phase motor. Usually, each of the motor phases is balanced relative to the other phases but not to the power supply. For purposes of example, one phase of the power supply may draw 75 amperes while the other two phases may draw 85 amperes. If one phase of the power supply is lost the remaining two phases will drive the motor causing overloading of said two phases by at least $\sqrt{3}$ times the normal current. It will be recognized that the current will be in excess of 100 amperes causing a malfunction of the power supply.

Further, consider for example a three phase resistance load such as a heater. If one phase is lost the heater output will decrease. The present invention is arranged to cut off power to the heater so that the heater or the input power supply can be checked to determine the cause of the reduced heater output, and in this sense the present invention acts as a monitor.

The applicant is aware of U.S. Pat. Nos. 4,647,825; 4,550,360; and 4,297,741 which were cited during the prosecution of the aforenoted U.S. application Ser. No. 046,455.

U.S. Pat. No. 4,647,825 which issued to Profio, et al on Mar. 3, 1987 relates to a motor controller with means responsive to a particular motor condition for preventing termination of power to the motor in response to fault conditions when these fault conditions occur during motor start up. Hence, a phase load detector receives an input signal from a converter. If there is a loss of one phase after the motor is up to speed the phase load detector generates a signal to open a motor relay. Thus, the Profio device is seen to relate to a distinctly different idea of means than that of the present invention.

U.S. Pat. No. 4,550,360 issued to Dougherty on Oct. 29, 1985 relates to a circuit breaker static trip unit and an analog signal processor within said unit which is provided with an A/D converter, a digital processor and an electrically alterable non-volatile read only memory (EAROM) for trimming and calibrating the trip unit. Likewise, this patent relates to a distinctly different idea of means than that of the present invention.

U.S. Pat. No. 4,297,741 issued to Howell on Oct. 27, 1981 relates to air core current transformers linked with the phase conductors of a power distribuiton circuit and which develop secondary voltage signals proportional to the rates of change of the phase currents. A comparator issues a circuit breaker trip initiating signal when the output voltage signal achieves a preselected threshold value. The disclosed invention is not seen to relate to the present invention.

SUMMARY OF THE INVENTION

This invention contemplates control apparatus for three phase alternating current load protection, wherein each of the phases is connected to a primary winding of a current transformer. When the load is energized signals are induced in the secondary windings of the transformers. The induced signals are applied to corresponding signal amplifying transistors. The transistors are connected in a serial amplification configuration for energizing a relay or like control circuit. The arrangement is such that if any of the three phases is lost the serial amplification circuit is interrupted causing the control circuit to open, whereby the load, the power supply, and auxilliary circuitry, as the case may be, are protected.

DETAILED DESCRIPTION OF THE INVENTION

Figure 1:
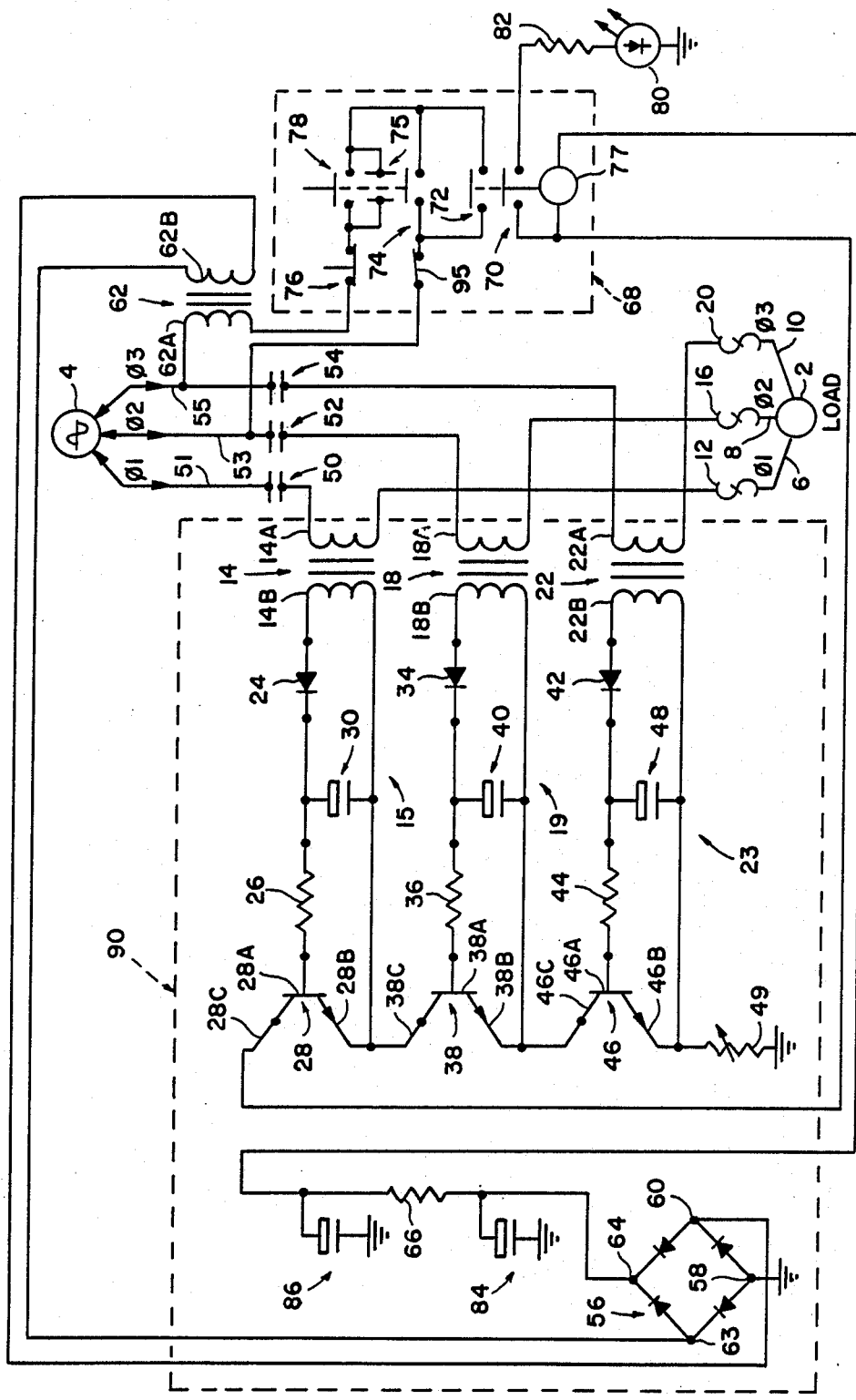
FIG. 1 is an electrical schematic diagram showing the control circuit of the invention in combination with a magnetic relay configuration.

With reference to FIG. 1, a three phase load, which maybe a motor or a heater or other like load, is designated by the numeral 2. Load 2 is driven by a suitable three phase AC power source 4.

Load 2 receives a three phase input $\phi 1$, $\phi 2$ and $\phi 3$ at each of the conductors 6, 8 and 10, respectively.

Conductor 6 is connected through a bimatellic relay or the like 12 to one leg of a primary winding 14A of a transformer 14 included in a circuit channel 15. Conductor 8 is connected through a bimatellic relay or the like 16 to one leg of a primary winding 18A of a transformer 18 included in a circuit channel 19, and conductor 10 is connected through a bimetallic relay or the like 20 to one leg of a primary winding 22A of a transformer 22 included in a circuit channel 23.

A secondary winding 14B of transformer 14 is inductively coupled to primary winding 14A, a secondary winding 18B of transformer 18 is inductively coupled to primary winding 18A and a secondary winding 22B of transformer 22 is inductively coupled to primary winding 22A. It will be understood that in the arrangement shown transformers 14, 18 and 22 are current transformers with signals being induced at secondary windings 14B, 18B and 22B, respectively.

One leg of secondary winding 14B of transformer 14 is connected through a rectifying diode 24 and a current limiting resistor 26 to a base 28A of a signal amplification transistor 28. The other leg of secondary winding 14B is connected to an emitter 28B of transistor 28. A filter and pulse producing capacitor 30 is connected across secondary winding 14B of transformer 14.

One leg of secondary winding 18B of transformer 18 is connected through a rectifying diode 34 and a current limiting resistor 36 to a base 38A of a signal amplification transistor 38. Emitter 28B of transistor 28 is connected to a collector 38C of transistor 38. A filter and pulse producing capacitor 40 is connected across secondary winding 18B of transformer 18.

One leg of secondary winding 22B of transformer 22 is connected through a signal rectifying diode 42 and a signal limiting resistor 44 to a base 46A of a signal amplifying transistor 46. Emitter 38B of transistor 38 is connected to collector 46C of transistor 46. A filter and pulse producing capacitor 48 is connected across secondary winding 22B of transformer 22. Emitter 46B of transistor 46 is connected to a thermister 49.

The other leg of primary winding 14A of transformer 14 is connected to power source 4 (phase $\phi 1$) through a magnetic contact 50 and a conductor 51; the other leg of primary winding 18A of transformer 18 is connected to power source 4 (phase $\phi 2$) through a magnetic contact 52 and a conductor 53; and the other leg of primary winding 22A of transformer 22 is connected to power source 4 (phase $\phi 3$) through a magnetic contact 54 and a conductor 55.

A full wave diode bridge rectifier circuit is designated by the numeral 56. Bridge circuit 56 is connected to ground at a circuit point 58. A circuit point 60 of bridge circuit 56 is connected to one leg of a secondary winding 62B of a transformer 62 and a circuit point 63 of bridge circuit 56 is connected to the other leg of secondary winding 62B. A primary winding 62A of transformer 62 is inductively coupled to secondary winding 62B.

A circuit point 64 of bridge circuit 56 is connected through a resistor 66 to a relay means 68. Collector 28C of transistor 28 is connected to relay means 68. Relay means 68 has relay contacts 70, 72, 74, 75, 76 and 78 and a relay 77.

Conductor 53 is connected to relay contact 72 and to relay contact 74. Relay contacts 70 and 72 are in ganged relation.

Conductor 55 is connected to one leg of primary winding 62A of transformer 62. The other leg of primary winding 62A is connected to relay contact 76. Relay contact 76 is connected to a relay contact 78. Relay contacts 74 and 78 are in ganged relation.

A light emitting diode (LED) 80 is connected through a resistor 82 to relay contact 70.

A filter capacitor 84 is connected intermediate bridge circuit point 64 and resistor 66 and a filter capacitor 86 is connected intermediate resistor 66 and relay means 68.

The arrangement including transformers 14, 18 and 22; transistors 28, 38 and 46, and bridge circuit 56; and the associated connecting circuitry form a signal detecting circuit designated by the numeral 90.

Figure 2:
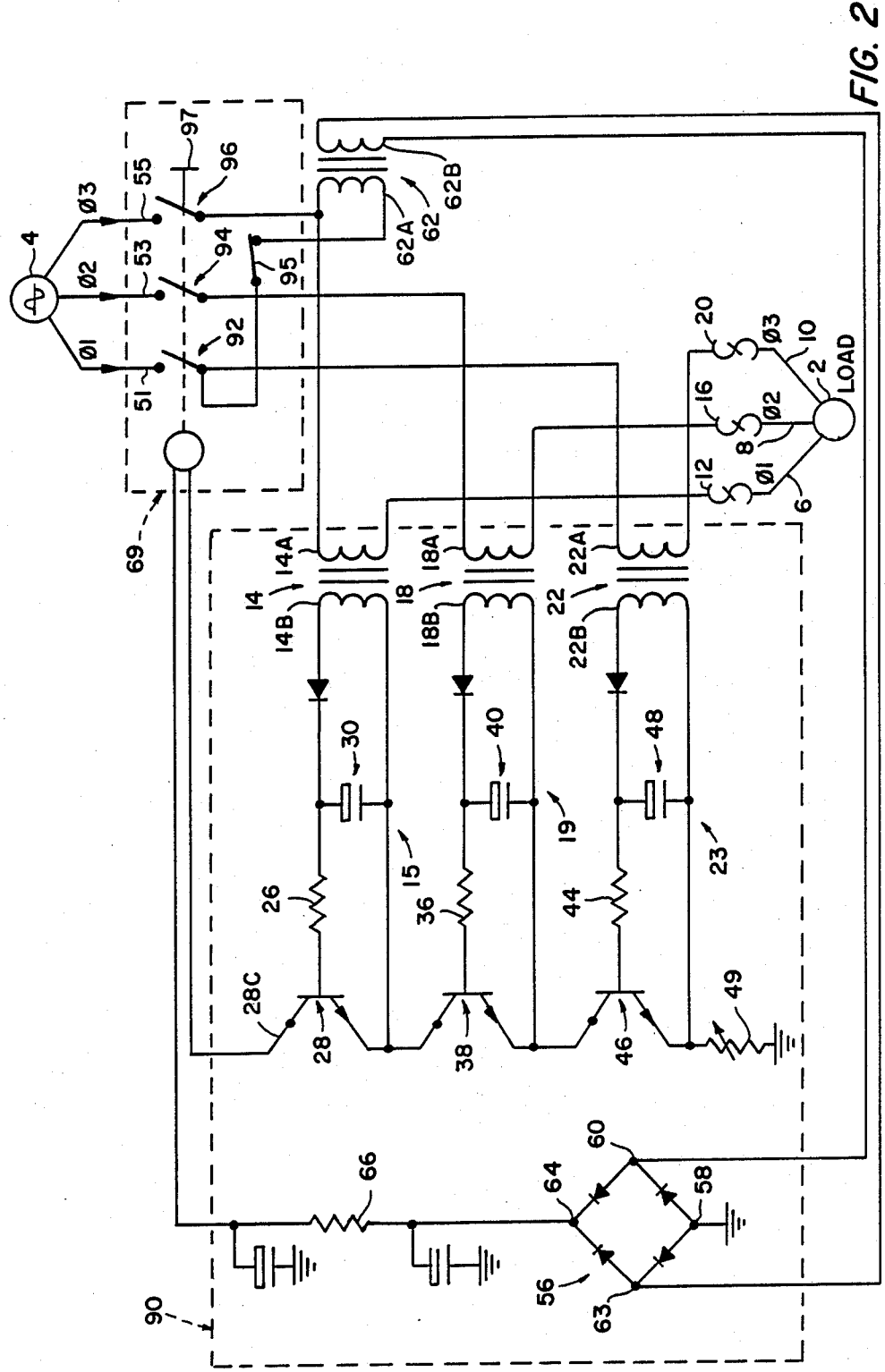
FIG. 2 is an electrical schematic diagram showing the control circuit of the invention in combination with a manual relay configuration.

With reference to FIG. 2, conductor 6 (phase $\phi 1$) is connected through bimetallic relay 12 to one leg of primary winding 22A of transformer 22; conductor 8 (phase $\phi 2$) is connected through bimetallic relay 16 to one leg of primary winding 18A of transformer 18; and conductor 10 (phase $\phi 3$) is connected through bimetallic relay 20 to one leg of primary winding 14A of transformer 14. The other leg of primary winding 22A is connected through a normally open relay switch 92 to conductor 51; the other leg of primary winding 18A is connected through a normally open relay switch 94 to conductor 53; and the other leg of primary winding 14A is connected through a normally open relay switch 96 to conductor 55. Switches 92, 94 and 96 are included in a relay means 69 and are gang operable.

Detecting circuit 90 is connected to relay 69 and to secondary winding 62B of transformer 62 via collector 28C of transistor 28, and through bridge circuit point 64; and through circuit points 60 and 63, as described with reference to FIG. 1.

Switch 92 is connected to one leg of primary winding 62A of transformer 62 and switch 96 is connected to the other leg of primary winding 62A.

OPERATION OF THE INVENTION

With reference to detecting circuit 90 shown in FIGS. 1 and 2, when power from source 4 is applied to load 2, signals are induced in secondary windings 14B, 18B and 22B of the respective transformers 14, 16 and 18. Capacitors 30, 40 and 48 filter the signals and provide pulses which are applied across the bases and emitters of transistors 28, 38 and 46, respectively, which amplify the applied pulses. The arrangement is such that transistors 28, 38 and 46 monitor the output of phases $\phi 1$, $\phi 2$ and $\phi 3$, respectively, and amplify the monitored outputs. The transistors are connected in a serial amplification configuration, the output of which, with the output of bridge circuit 56 at circuit point 64, is applied for controlling relay means 68 or 69, as the case may be.

If any of the phases $\phi 1$, $\phi 2$, $\phi 3$ drops out, no current will be induced in the secondary winding of the corresponding transformer. The current to the corresponding transistor will be interrupted to open the serial amplification configuration causing relay means 68 or 69 to drop out, whereupon the circuit including load 2 and power supply 4 is opened.

With particular reference to FIG. 1, relay means 68 controls the power to detecting circuit 90 and to primary winding 62A of transformer 62 which functions as a contact coil for contacts 50, 52, 54 and 75. When normally open contacts 74 and 78 close a circuit is formed by said closed contacts, normally closed contact 76 and a closed overload switch 95. Thus, contacts 50, 52, 54 and 75 make contact via primary winding 62A which applies power from detecting circuit 90 to relay 77 causing contacts 70 and 72 to make contact. When contacts 74 and 78 are in their normal condition, the coil working circuit is formed by contacts connected to contact 70, indicates the status of the detecting circuit and working load. If a phase drop-out occurs, detecting circuit 90 will be interrupted as aforenoted to release relay 77 which disconnects winding 62A from contact 70 and 72 of relay means 68.

In consideration of the fact that the resistance of the serial amplifier arrangement including transistors 28, 38 and 46 varies with temperature, thermister 49 is connected to said arangement to regulate the resistance.

With particular reference to FIG. 2, with the arrangement shown ganged relay switches 92, 94, 96 are manually closed via a push button 97. If any of the respective phases φ1, φ2, φ3, drops out, relay means 69 drops out and the switches open. The arrangement is such that bimetallic relays 12, 16 and 20 function as overload relays. When they get hot they open normally closed switch 95 to disconnect primary winding 62A, the same being shown in both FIGS. 1 and 2.

With reference to relay means 68 and 69 being of the magnetic or manual type, it has been found that the manual type is for loads under three HP, and the magnetic type is for larger loads.

There has thus been described control apparatus for three phase alternating current load protection, wherein if any of the three power phases is lost a serial amplification circuit is interrupted causing a relay control circuit to remove power, whereby the load, the power supply and auxilliary circuitry, as the case may be, are protected. The arrangement has a relatively quick reaction time for detecting a phase failure and provides a more effective and more economic control arrangement than has heretofore been known. It has been found that the apparatus described has a phase failure protection time of approximately one second.

With the above description of the invention in mind reference is made to the claims appended hereto for a definition of the scope of the invention.

What is claimed is:

1. Control apparatus for three phase alternating current load protection, comprising:
   a load circuit including a load and a power supply for the load said power supply having three phases, with each of said phases providing a full wave alternating output;
   a detecting circuit connected to the load circuit for detecting when all three of the phases provide a half wave output in one sense of the full wave alternating output and for detecting when at least one of said half wave outputs is absent, and for providing a controlling output; and
   means connected to the load circuit and to the detecting circuit and responsive to the controlling output from the detecting circuit when all three of the half wave outputs in the one sense are present to close the load circuit, and responsive to said controlling output when at least the one of said half wave outputs in the one sense is absent to open said load circuit.

2. Apparatus as described by claim 1, wherein the detecting circuit includes:
   a first channel connected to a first of the phases for detecting the presence and absence of a half wave output in the one sense therefrom;
   a second channel connected to a second of the phases for detecting the presence and absence of a half wave output in the one sense therefrom;
   a third channel connected to a third of the phases for detecting the presence and absence of a half wave output in the one sense therefrom; and
   the first, second and third channels being connected in serial configuration for providing a first output.

3. Apparatus as described by claim 2, wherein each of the first, second and third channels includes:
   a current transformer having a primary winding connected to a corresponding phase of the three phases for receiving the full wave alternating output therefrom and a secondary winding inductively coupled to the primary winding;
   a rectifying diode connected to the secondary winding;
   a current limiting resistor connected to the rectifying diode;
   a signal amplifying transistor having a base connected to the current limiting resistor; and
   filter and pulse producing means connected across the secondary winding intermediate the rectifying diode and the current limiting resistor.

4. Apparatus as described by claim 3, wherein:
   one leg of the secondary winding is connected to the rectifying diode; and
   the other leg of said winding is connected to the collector of the transistor.

5. Apparatus as described by claim 4, including a serial amplifier arrangement wherein:
   the emitter of the transistor in the first channel is connected to the collector of the transistor in the second channel;
   the emitter of the transistor in the second channel is connected to the collector of the transistor in the third channel;
   the first output being provided at the collector of the transistor in the first channel; and
   means conected to the emitter of the transistor in the third channel for regulating the resistance of the serial amplifier arrangement commensurate with temperature.

6. Apparatus as described by claim 5, wherein the means connected to the load circuit and to the detecting circuit includes:
   relay means connected to the collector of the emitter of the transistor in the first channel and connected to the load circuit.

7. Apparatus as described by claim 6, including:
   indicting means connected to the relay means for indicating the opened and closed status of the load circuit.

8. Apparatus as described by claim 6, wherein:
   the relay means is magnetically operable.

9. Apparatus as described by claim 6, wherein;
   the relay means is manually operable.

10. Apparatus as described by claim 6, wherein the relay means includes:
    a relay connected to the collector of the emitter of the transistor in the first channel, and having a plurality of contacts connected in operational relation thereto and connected to the load circuit; and
    a transformer having a primary winding connected to at least two of the contacts and a secondary winding inductively coupled to the primary winding.

11. Apparatus as described by claim 10, wherein:
    the detecting circuit includes a power circuit connected to the secondary winding of the relay means transformer and providing a second output; and
    the first and second outputs providing the controlling output.

12. Apparatus as described by claim 11 wherein the power circuit includes:
    a bridge rectifier having first, second, third and fourth output terminals;
    the second output provided at the first output terminal;

the second output terminal connected to one leg of the secondary winding of the relay means transformer;
the third output terminal connected to ground; and
the fourth output terminal connected to the other leg of said secondary winding.

13. Apparatus as described by claim 12, including:
filter means connected to the first output terminal;
current limiting means connected to the filter means; and
other filter means connected to the current limiting means and providing the second output.

14. Apparatus as described by claim 1, wherein:
the half wave output in one sense of the full wave alternating output is the positive half wave output of said full wave alternating output.

* * * * *